June 18, 1957 W. H. ODLUM ET AL 2,796,091
MOUNTING FOR AN AXIALLY MOVABLE MOTOR
Filed Dec. 13, 1955 2 Sheets-Sheet 1

INVENTORS
William H. Odlum
William F. Hosford
BY
Attorney

June 18, 1957   W. H. ODLUM ET AL   2,796,091
MOUNTING FOR AN AXIALLY MOVABLE MOTOR
Filed Dec. 13, 1955   2 Sheets-Sheet 2

INVENTORS
William H. Odlum
William F. Hosford
BY *H. Thrall Brewer*
Attorney

2,796,091

MOUNTING FOR AN AXIALLY MOVABLE MOTOR

William H. Odlum, Wilmette, and William F. Hosford, Chicago, Ill., assignors to Duro Metal Products Co., Chicago, Ill., a corporation of Illinois Application December 13, 1955, Serial No. 552,790

7 Claims. (Cl. 143—36)

This invention relates to a motor mounting which is movable in a direction axially of the motor, wherein the weight of the motor is used to take up the slack in a belt or chain driven by the motor. For purposes of illustration this invention will be described with reference to its application to a motor for driving a tilt arbor saw, but it is understood that the invention is not limited to such application.

Tilt arbor saws are presently so constructed that the drive pulley for the saw is axially offset from the plane of the saw itself. The saw, however, must be capable of tilting about an axis passing through the plane of the saw. To satisfy these conditions, the drive pulley must move in an arc of a circle disposed in a plane parallel with the axis of the motor shaft which results in both lateral and vertical components of movement of the drive pulley.

To insure correct driving conditions for the belt, i. e., conditions of least angularity between the plane of the belt and the plane of the pulleys cooperating therewith, the motor by which the belt is driven must be capable of both vertical and lateral movements to follow the drive pulley for the saw. One simple means for permitting such movement comprises a carriage fixed to the motor base and mounted on a rail through rollers in such manner that the center of gravity of the motor is offset or eccentric to the rail on the far side of the rail relative to the saw arbor. This permits the motor to rotate about the rail and thereby take up any vertical movement required of it by the corresponding vertical movement of the drive pulley. Lateral movement of the motor is accommodated by the rollers which roll along the rail in response to a pull exerted on the motor and its mounting by the belt itself. Such construction is shown, for example, in T. A. Hess Patent No. 2,704,463, dated March 22, 1955, Driving Means for Tiltable Arbors and the Like.

It has been found, however, that with previous designs of roller mounted carriages for tilt arbor saw motors a certain amount of resistance to lateral movement existed despite the fact that the rollers were perfectly free to roll and in fact were provided with antifriction bearings. Under extreme conditions, that is, when the tilting of the saw was accomplished very rapidly, the motor was found to lag behind, or to resist, the required lateral movement to such an extent as to cause the belt to leave the pulley.

It is an object of this invention accordingly to provide a roller-mounted carriage for a tilt arbor saw motor or the like, which readily and quickly follows the movement of the driven pulley on the arbor of the saw.

Due to the fact that the carriage is required to swing around the rail on which its rollers travel, and furthermore, because of the sudden applications of force on the motor in a direction transversely of the rail brought about by the sudden loads which may be imposed upon the saw itself as it engages the material to be cut, it has been found necessary to use either three or four flanged rollers disposed on diametrically opposite points on the rail to lock the carriage against movement transversely of the rail. In such prior construction the axes of the rollers were parallel, the upper rollers bearing the load and the lower rollers serving merely to prevent the upper rollers from leaving the rail. It may be appreciated that the number of rollers used in such carriage affected the cost of the entire saw.

It is another object of this invention to provide a roller-mounted carriage for a tilt arbor saw motor which utilizes but two rollers for its support.

As the more specific object, this invention seeks the provision of a roller-mounted carriage for a tilt arbor saw motor wherein the axes of the rollers are so related with reference to the weight of the motor and the pull of the belt driven thereby that these forces are taken by the rollers in a direction perpendicular to their axes, thereby promoting pure rolling between the rollers and rail and substantially unhindered movement of the carriage along the rail.

These and other objects of this invention will become apparent from the following detailed description when taken together with the accompanying drawings in which, Fig. 1 is a side elevational view of the mounting of this invention shown applied to a motor for a tilt arbor saw;

Figs. 6 to 10 are force diagrams applicable to the mounting selected to illustrate this invention.

Figure 1:
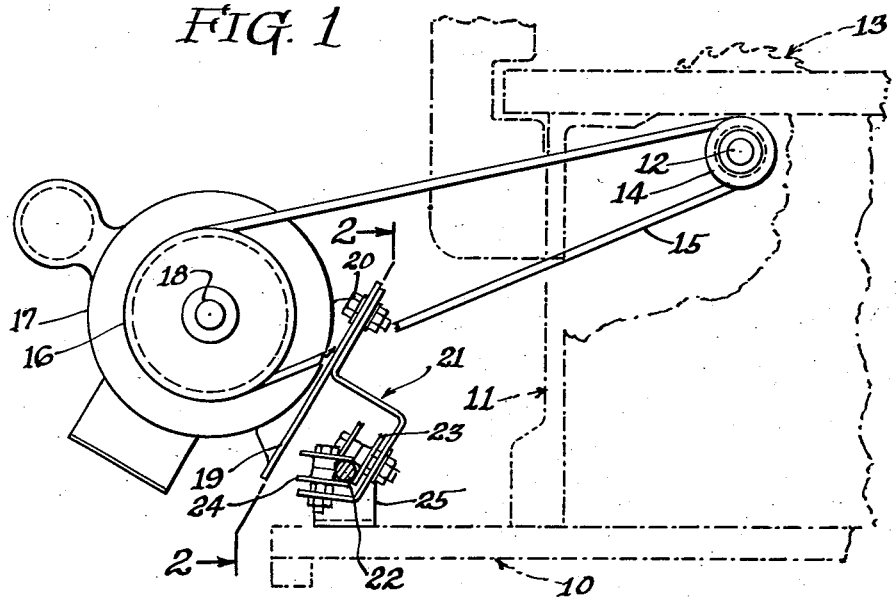

Referring now to Fig. 1 for a detailed description of the invention, there is shown in dotted outline a bench 10 on which is mounted the frame 11 of a tilt arbor saw of known construction, said saw including an arbor 12 which drives a circular saw 13, said arbor 12 being in turn driven through a pulley 14 and belt 15 from the drive pulley 16 of a motor 17. In the saw illustrated, drive pulley 16 is mounted for rotation with the shaft 18 of motor 17. Said motor 17 is provided with a base 19 which is bolted as at 20 to a carriage designated generally by the reference character 21 and mounted for movement on a rail 22, the axis of which is parallel to the axis of shaft 18. The mounting means for the carriage on rail 22 includes flanged rollers 23 and 24, the disposition of the axes of which is determined in the manner hereinafter to be described.

Figure 2:
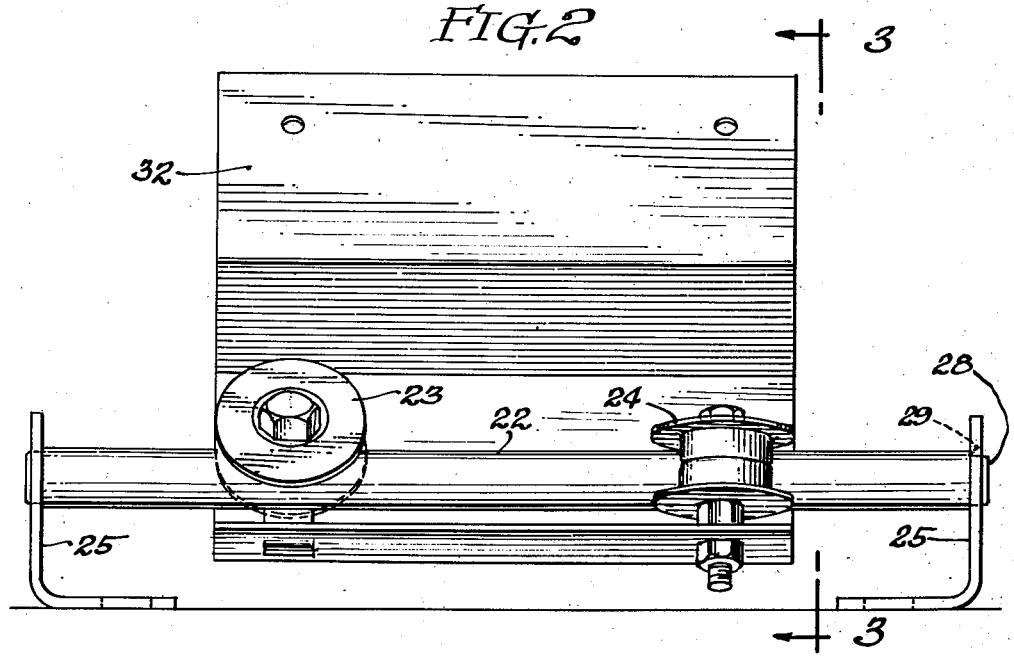
Fig. 2 is a greatly enlarged front elevational view of the mounting alone, the view being taken along line 2—2 of Fig. 1.
Figure 3:
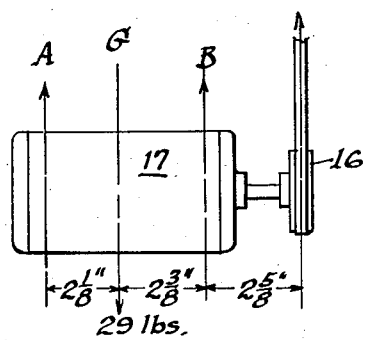
Fig. 3 is an enlarged side elevational view of the mounting of Fig. 2, the view being taken along line 3—3 of Fig. 2.
Figure 5:
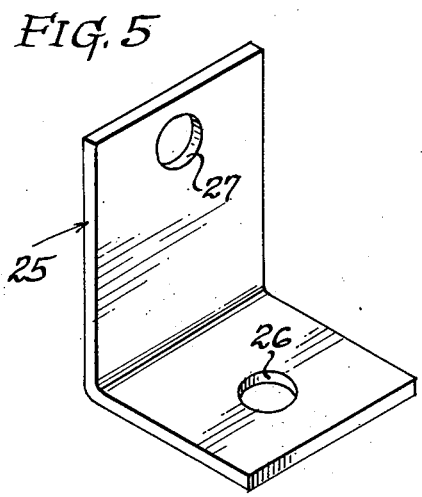
Fig. 5 is a perspective view of a bracket used to support the rail for the motor mounting carriage on the frame of the saw.
Figure 4:
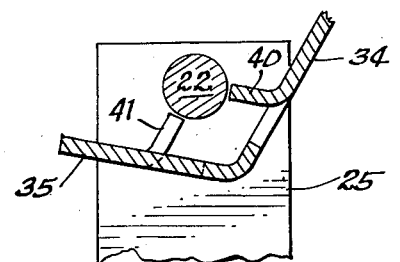
Fig. 4 is a fragmentary side elevational view of a portion of the carriage for the motor.

Rail 22 is supported on bench 10 through spaced substantially identical angle brackets 25 shown more clearly in Figs. 2 and 5. Each bracket 25 is formed from a substantially rectangular plate which is drilled or punched to form openings 26 for the reception of bolts or the like by which the brackets are fastened to bench 10, and side openings 27 for the reception of the ends of rail 22. It is then bent into the form shown in Figs. 2 and 5. To prevent lateral movement of rail 22 relative to brackets 25, the ends 28 of rail 22 are of reduced diameter, as is likewise the side opening 27, to form a shoulder 29 at either end of the rail which abuts on the adjacent surfaces of the brackets to hold the rail against such endwise movement.

When saw 13 is tilted to produce an angular cut, arbor 12 will be similarly tilted and the end thereof on which pulley 14 is mounted will be moved both vertically and horizontally along the arc described by the end of arbor 12. Motor 17 may oscillate about rail 22 and may likewise move axially of said rail on its rollers 23 and 24 so that its movement likewise has a vertical and a horizontal component. It may also be noted that motor 17 is mounted eccentrically with respect to rail 22, that is, the center of gravity of the motor is to one side (the left as viewed in Fig. 1) of rail 22 which produces a turning moment on the rollers 23 and 24 in a counterclockwise direction as viewed in that figure. Belt 15 exerts a force in opposition to the turning moment produced by the eccentric weight of motor 17, and when sudden changes in load are encountered, the torque in pulley 16 tends to roll the pulley along belt 15 toward driven pulley 14.

It may thus be apparent that there are a number of forces acting upon rollers 23 and 24, that the magnitude of the forces varies and that their direction may likewise vary. It is possible, however, in accordance with this invention to select a representative set of dimensions and forces and determine from them the angular disposition of the axes of rollers 23 and 24 relative to motor base 19, which will produce substantially pure radial forces in the rollers and thus result in pure rolling of the rollers on rail 22. With the elimination of side thrust on the rollers brought about by the pure rolling action of the rollers 23 and 24, a minimum force is required to move the carriage 21 along rail 22. In this manner the carriage can be made to follow very readily, the movements of driven pulley 14 as saw 13 is tilted and thus eliminate the loss of drive which formerly occurred when the saw was suddenly tilted and the carriage failed to follow promptly, the belt accordingly slipping off one or both of the pulleys.

Referring now to Figs. 6 to 10 inclusive for analysis of the forces acting upon rollers 23 and 24, let it be assumed that motor 17 is supported by the two rollers 23 and 24, which for purposes of analysis are designated A and B respectively and that the centers of the rollers are 4½ inches apart, with the center of the motor pulley (16) 2⅝ inches to the right (Fig. 6) of roller B. Let it be assumed further that the center of gravity of the motor is 5 inches to the left of the pulley 16.

Figure 7:
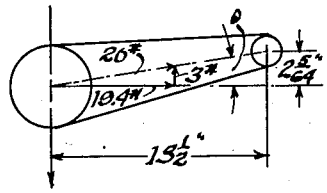
Figure 10:
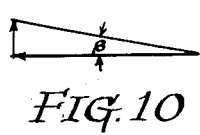
Figure 8:
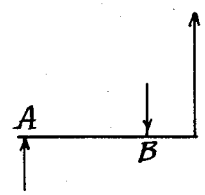
Figure 9:
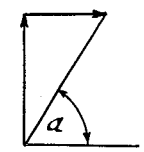

From experience it is known that motor 17 should be mounted behind saw 13 approximately as shown in Fig. 1 and that the belt tension must be 20 pounds to use a ½ H. P. motor to full advantage. The forces acting on motor 17 are the belt tension, which may be resolved into vertical and horizontal components as shown in Fig. 7, the weight of the motor, and the forces at rollers A and B. The unknown forces are those at A and B and may be determined as follows, using the assumed dimensions above:

The vertical and horizontal components of the belt tension are 3 pounds and 19.4 pounds, respectively. The vertical force acting on B is $\Sigma M_A = -(3 \times 7\frac{1}{8}) + (29 \times 2\frac{1}{8}) - 4\frac{1}{2}B = 0$
$4.5B = 61.6 - 21.35$
$B = 8.95$ pounds The vertical force acting on A is $\Sigma M_B = -(29 \times 2\frac{3}{8}) - (3 \times 2\frac{5}{8}) + 4\frac{1}{2}A = 0$
$4.5A = 76.7$
$A = 17$ pounds The horizontal force acting on B is $\Sigma M_A = -(19.4 \times 7\frac{1}{8}) + 4\frac{1}{2}B = 0$
$4.5B = 138$
$B = 30.7$ pounds The horizontal force acting on A is $\Sigma M_B = 4\frac{1}{2}A - (19.4 \times 2\frac{5}{8}) = 0$
$4.5A = 51$
$A = 11.3$ pounds The angle of the resultant force at A with respect to the horizontal is $$\tan a = \frac{17}{11.3}$$

$$a = 56.5°$$

The angle of the resultant force at B with respect to the horizontal is $$\tan \beta = \frac{8.95}{30.7}$$

$$\beta = 16.3°$$

Thus the included angle between the axes of rollers A and B, if the loading on the rollers is to be purely radial is approximately 107°. As the saw 13 is raised or lowered, the angle $\theta$ in Fig. 7 changes slightly, but not enough to change materially the purely radial loading of the rollers.

The foregoing analysis thus indicates the desirable disposition of the axes of rollers 23 and 24 relative to one another and to the horizontal. Accordingly, roller 23 is mounted on a pin which may conveniently be a bolt 30 supported from carriage 21 with its axis normal to the resultant at A. Roller 24 is mounted on carriage 21 by means of a similar bolt 31 the axis of which is normal to the resultant at B. Carriage 21 may thus be made from a single substantially rectangular piece of sheet steel which is formed to present a flat section 32 which overlies, and is clamped to, base 19 by bolts 20, a section 33 angularly disposed with respect to section 32, a third section 34 the plane of which is normal to the desired axis of the pin 30 and an end section 35 the plane of which is normal to the desired axis of bolt 31. Said bolts 30 and 31 are secured to sections 34 and 35, respectively, by double clamping nuts 36 and 37, respectively. Other means for securing bolts 30 and 31, or their equivalents, to sections 34 and 35 may suggest themselves to those skilled in the art. It is desirable, however, that rollers 23 and 24 be spaced from their respective supporting sections 34 and 35 so that said rollers may rotate freely about their supporting pins. It is also contemplated that anti-friction means may be used between the rollers and their supports still further to reduce resistance to movement of the carriage along the rail.

Each roller 23, 24 is formed with radially outwardly extending flanges 38 between which rail 22 is received and by which the roller is guided on the rail as it moves axially thereof. The corresponding flanges for pulley 24 are shown at 39. Since the disposition of the axes of the rollers is calculated to produce substantially pure radial thrust on the rollers, very little side thrust is produced to cause the flanges 38 and 39 to bear against rail 22 and retard the movement of the carriage along said rail.

The selected angular disposition of the axes of rollers 23 and 24 to produce primarily radial thrust on the rollers also makes unnecessary companion rollers to rollers 23 and 24 disposed on diametrically opposite sides of rail 22 from said rollers. Thus it is sufficient for purposes of maintaining carriage 21 on rail 22 to provide a stop 40 on section 34 to hold rail 22 between flanges 39 of roller 24 and stop 41 on section 35 to hold rail 22 between flanges 38 of roller 23. Both said stops are preferably made by bending tabs upwardly from sections 34 and 35, the free ends of the tabs being disposed from their respective rollers a distance slightly greater than the diameter of rail 22. Although the general plane of the tabs is disclosed as being parallel with the axis of rail 22, it is not essential that such parallelity be maintained and in fact the tabs may extend transversely of the rail if it is found more convenient to so dispose them. It is desirable, however, that each tab be directly opposite its cooperating roller and so related thereto that relative movement of the roller and rail is limited to movement axially of the rail.

For ease of assembly, it is preferred that one of the brackets 25 which supports rail 22 be removable so that rail 22 may be assembled with respect to carriage 21 by inserting the rail between each roller and its retaining tab until the rail extends to either side of the carriage as viewed in Fig. 2, and then inserting the ends of the rail into the openings in the brackets 25, whereupon the removed bracket may be secured to bench 10.

A mounting made in accordance with this invention has been found to follow quickly and easily the movements of a driven pulley and in fact it was impossible to make the belt leave the pulley under conditions which formerly invariably resulted in an interrupted drive.

It is understood that the foregoing description is merely illustrative of a preferred embodiment of the invention and that the scope of the invention is not to be limited thereto but is to be determined by the appended claims.

We claim:

1. In combination, a frame, a drive pulley, motor means, flexible means connecting the motor and pulley for driving the pulley, a carriage for the motor, a load driven by the pulley and shiftable in a manner to produce an axial component of force in the pulley, and means mounting the carriage for movement relative to the frame in a direction axially of the pulley to follow the load, said means including relatively movable rail and roller members, means securing one of said members to the frame and the other member to the carriage, said roller securing means supporting the carriage at points axially spaced along the rail and with the axes of the roller members normal to the resultant forces acting upon said roller members.

2. In combination, a relatively fixed frame, a drive pulley, means for driving the pulley, a carriage for the pulley driving means, a load driven by the pulley and shiftable in a manner to produce an axial component of force in the pulley, and means mounting the carriage for movement relative to the frame in a direction axially of the pulley to follow the load, said mounting means comprising a pair of rollers axially spaced relative to the pulley, a rail mounted on the frame substantially parallel to the pulley axis and on which the rollers roll, means mounting the rollers on the carriage with their axes normal to the direction of the vectors representing the resultant forces acting on the rollers, such that only substantially pure radial forces act upon the rollers to reduce to a minimum the resistance of the carriage to movement along the rail, and non-rotatable means for retaining the rollers on the rail.

3. The combination described in claim 2, said carriage comprising a plate having adjacent sections angularly related to one another to provide planes which are parallel with the planes in which the rollers rotate.

4. The combination described in claim 2, said carriage comprising a plate having adjacent sections angularly related to one another to provide planes which are parallel with the planes in which the rollers rotate, and said non-rotatable means for retaining the rollers on the rail comprising means extending from a section in one plane and on the side of the rail opposite the roller in the other plane and into proximity with the rail.

5. In combination a bench, a circular saw, an arbor on which the saw is mounted for rotation therewith, a pulley fixed to the arbor, said arbor and pulley being tiltable about an axis transverse to the saw arbor axis and passing through the saw, a motor having a pulley driven thereby, belt means connecting the motor and arbor pulleys to transmit the drive from the motor to the saw, said saw arbor pulley having an axial component of movement as it is tilted, a carriage for the motor, a rail mounted on the bench with its axis generally parallel with the axial component of movement of the saw arbor pulley and disposed between the motor and saw in a horizontal direction, a carriage for the motor, rollers spaced axially of the rail and cooperating therewith to roll axially of the rail and also to oscillate about the rail, and means mounting the rollers on the carriage with the axes of the rollers normal to the resultant force acting on each roller.

6. The combination described in claim 5, there being only two axially spaced rollers, and fixed means for retaining the rollers on the rail.

7. The combination described in claim 5, there being only two axially spaced rollers, portions of the carriage being deformed to extend into proximity to the rail opposite each roller to retain the rollers on the rail.

References Cited in the file of this patent
UNITED STATES PATENTS

| | | |
|---|---|---|
| 2,471,773 | Pollak | May 31, 1949 |
| 2,590,035 | Pollak | Mar. 18, 1952 |
| 2,704,463 | Hess | Mar. 22, 1955 |